_United States Patent Office_

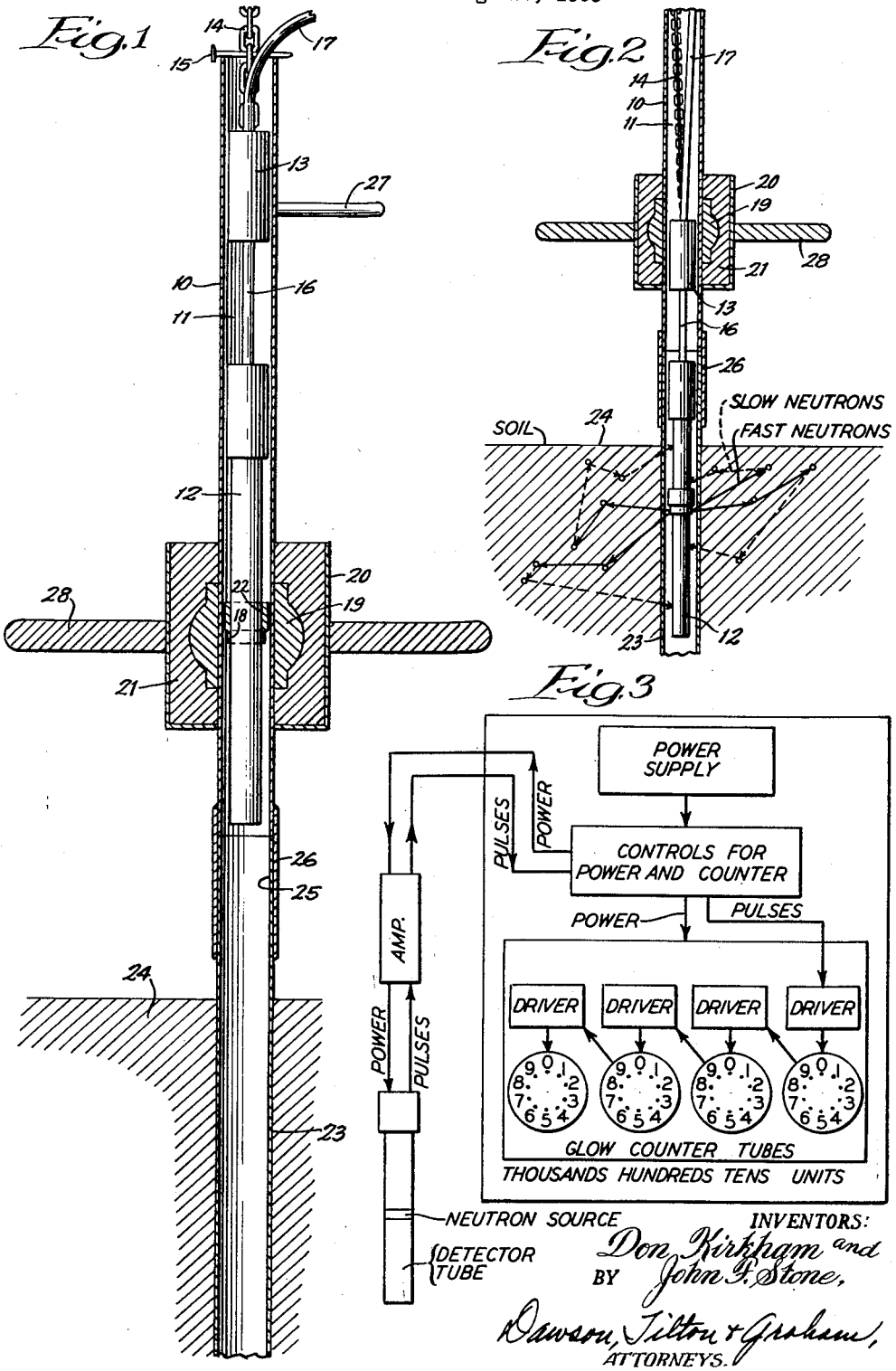

2,999,160
Patented Sept. 5, 1961

2,999,160
APPARATUS FOR MEASURING THE WATER CONTENT OF SOIL
Don Kirkham, Ames, and John F. Stone, Boone, Iowa, assignors to Iowa State College Research Foundation, Inc., Ames, Iowa, a corporation of Iowa
Filed Aug. 26, 1955, Ser. No. 530,795
2 Claims. (Cl. 250—83.1)

This invention relates to an apparatus for measuring the water content of soil or other materials by neutron detection and counting.

The use of fast neutron emitters in conjunction with gamma ray detectors has achieved considerable popularity in recent years for the detection of lithological characteristics associated with the presence of oil. The customary procedure has generally involved the irradiation of a portion of substrata with high speed neutrons. Since the fast neutrons carry no charge, they easily penetrate or diffuse through most solid materials without a material loss of energy. When the fast neutrons collide with the nuclei of hydrogen atoms, however, a loss of energy results and, after a succession of such collisions, the neutrons are slowed to thermal velocities. Captures of these slow neutrons by the nuclei of certain elements results in the emission of liberated binding energy in the form of gamma radiation which is then measured by a gamma ray detector. The presence of gamma rays thus indicates the existence of nuclear reactions between atomic nuclei and slow neutrons, which in turn indicates the presence of hydrogen compounds, such as petroleum, responsible for reducing the speed of the neutrons emitted from the fast neutron source.

It is evident, therefore, the present commercial methods for detecting hydrogen-containing compounds are generally indirect and are dependent upon the amount of gamma radiation produced by nuclei capturing the fast neutrons. The number of gamma counts from a given portion of sub-strata not only depends upon the hydrogen content of the strata, but also upon the amount and nature of the material which undergoes nuclear reactions with the slow neutrons. While the presence of these two independent factors may be tolerable, or even desirable, for determining the general composition of substrata, it is clearly undesirable where a quantitative measurement of only hydrogen-containing compounds is to be made. The inadequacy of gamma ray detection techniques is particularly apparent where the water content of a volume of soil is to be accurately measured independently from the nature of the particular soil.

It is, therefore, a main object of the present invention to provide an apparatus for accurately and reliably measuring the moisture content of a variety of soils and other materials. Another object is to provide an apparatus adapted to emit fast neutrons and to directly and accurately detect the presence and number of slow neutrons in a quantity of soil or other material. Another object is to provide a portable apparatus for quantitatively measuring the moisture of soil comprising an emitter of fast neutrons perimetrically extending about the intermediate portion of an elongated slow neutron detector tube, the annular emitter and detector tube being shiftably mounted within a tubular casing. A further object is to provide a mobile apparatus for determining the water content of soil and having an elongated detector tube shiftably mounted within a tubular casing, the detector tube being provided with an annular emitter placed intermediate of its ends, and a standardizing block of paraffin extending about the intermediate portion of the tubular casing. Other objects will appear from the specification and drawings, in which:

FIGURE 1 is a sectional side view of a probe unit, showing a detector tube in retracted or raised position, FIGURE 2 is similar to FIGURE 1, but shows the detector tube lowered into operating position; FIGURE 3 is a diagrammatic view, showing the probe and counting units embodying the present invention.

Referring to the drawings, FIGURE 1 shows a probe unit comprising a tubular casing 10 which provides an elongated chamber 11 and which houses a slow neutron detector tube 12 and an amplifier 13. The amplifier 13 and the detector tube 12 are shiftably supported within the casing 10 by a chain 14 which may be locked in any desired position by support pin 15 or by any other suitable means.

The elongated slow neutron detector 12 is a $B_{10}$ enriched boron-lined ionization tube. Enriched boron coats the inner surface of the tube and provides a cathode surface for the ionization chamber. When slow neutrons are absorbed or captured by the enriched boron lining of the tube, the $B_{10}$ nuclei disintegrate and the fragments ionize, thereby generating an electric current. A tube suitable for purposes of this invention is now commercially available as GE-9159777 G6.

The electrical impulses produced by the detector tube pass directly through cable 16 to the amplifier 13 which magnifies the electric current, and then through cable 17 to a counting unit which will be described shortly.

As shown in FIGURE 1, a fast neutron source 18 in the shape of an annulus extends about the detector tube 12 at a spaced distance intermediate the ends of the tube and secured to the tube by any suitable means. This annular neutron source may be composed of any of several commonly used neutron source materials, such as radium and beryllium, actinium and beryllium, polonium and beryllium, etc.

In the past, it has been customary either to mount a fast neutron source at one end of a detector tube or to place the source separately and apart from the detector tube but near one end of that tube. While close proximity of a detector and a neutron source has generally been considered essential for proper sensitivity of the detector tube, the positioning of a neutron source at a distance from, or at the end of a detector tube has heretofore been deemed necessary to reduce or void the erratic electrical transmissions caused by particles or rays passing directly from the neutron source to the detector.

It might be thought, therefore, that the mounting of the annular neutron source or emitter 18 about the middle portion of detector tube 12 would produce undesirable random outbursts of electrical impulses from the detector to the amplifier and counting unit, and reduce the accuracy of the apparatus for the measurment of soil moisture. Surprisingly, we have found that the central and perimetrical arrangement of the neutron emitter upon the detector tube, compared with end positioning of a neutron source, not only increases the accuracy and consistency of moisture determinations, but actually doubles the sensitivity of the detector apparatus. Further accuracy and sensitivity is achieved by placing amplifier 13 in close proximity to the detector tube so that thermal noises in the line or extraneous interferences in the cable are unlikely, and by combining the detector and amplifier with a counter which directly and accurately records the actual number of disintegrations within the ionization chamber.

As already mentioned, the detector tube 12 and amplifier 13 are movably mounted within casing 10 so that they may be lowered or extended for operation and raised or retracted for transportation of the apparatus. Casing 10 is provided with an annular lead shield 19 which extends perimetrically about the casing 10 at a position intermediate of its ends for the absorption of gamma rays and the protection of persons carrying and operating the apparatus. FIGURE 2 illustrates the lead shield enclosed within a cylindrical container 20 which is welded or otherwise secured to the tubular casing 10 to form an integral portion thereof. Between the lead shield 19 and the wall of container 20 is a paraffin block 21 which not only acts as an effective fast neutron shield when the detector tube is in upward or retracted position, but which also serves as a standard source of slow neutron counts with which the counts obtained from soil moisture may be compared. As a shield, the paraffin block 21 slows fast neutrons because of its hydrogen content and therefore behaves similarly to water contained within the soil.

In addition to the protection offered by the lead and paraffin shields 19, 21, the detector tube 12 is provided with a lead ring 22 directly above the neutron emitter 18 which protects an operator from gamma radiation in a vertical direction. Like the neutron emitter 18, the lead ring 22 may be bonded upon the detector tube, or affixed by any other suitable means.

When soil moisture is to be measured by the present invention, an access pipe 23, shown in FIGURES 1 and 2, is driven into the soil 24 so that the top portion of the access pipe protrudes above the soil surface. The lower portion of tubular casing 10 is provided with an enlarged sleeve portion 26 which slips over the top portion 25 of the access pipe and secures the tubular casing 10 in upright position. The detector tube 12, neutron emitter 18 and amplifier 13 are then lowered into the access tube to any desired depth below the soil surface, as illustrated in FIGURE 2. In agronomic practice, this depth would ordinarily be about 3 to 6 feet, the depth of root penetration. The fast neutron emitter irradiates the surrounding soil with fast neutrons from a concentrated source thereof. The paths of travel of the fast neutrons are indicated by the lines bearing the outgoing arrows. The fast neutrons traveling along these paths eventually collide with the nuclei of hydrogen atoms which are represented by small circles and so labeled in FIGURE 2. The fast neutrons give up a considerable portion of their energy to the hydrogen nuclei by virtue of the simple elastic collision by the neutron and hydrogen nucleus. The neutron is thus slowed down to approximately thermal velocities and deflected toward the slow neutron detector. The paths of travel of the slow neutrons are diagrammatically indicated by the enclosing arrows. On reaching the slow neutron detector tube, the slow neutrons are captured by the detector which is connected to the amplifier 13 and the counting unit. The counting unit is adapted to record the counts per unit time produced by the capturing of the slow neutrons. Thus, if there is a relatively large amount of water in the material being measured, there are a proportionally large number of counts per unit time registered by the recorder.

It has been determined experimentally that the relationship between the counts per minute of slow neutron produced by a constant source of fast neutrons is proportional to the water content per unit volume of the material being measured so long as the hydrogen atoms in the material are substantially all contained in the water molecules. While it might at first be thought that the apparatus of the present invention would not be applicable for measuring the moisture content of soils because of the various and non-uniform textures of soils, we have found that the same calibration curve for moisture content is obtained despite wide variations in the textures and the nature of soils tested with the present invention.

Although the precise theoretical explanation for this result is not completely known, it is believed that the directness of slow neutron detection is in a large part responsible for the accuracy and reliability of the soil moisture determinations. That is, by combining a slow neutron detector with the radioactive source and a counter, we are able to directly determine the number of neutrons slowed to thermal velocities as a result of the water content of the soils, irrespective of the particular texture or quality of those soils.

Since the sensitivity of the detector tube 12 and the amplifier 13 may vary over a period of time, accurate counting and measurement of soil moisture requires a standardizing device which will provide a constant number and quality of slow neutrons at all times. This is provided by the paraffin block 21 which has a high content of hydrogen atoms and produces a slowing effect upon neutrons similar to water. Therefore, in order to calibrate the apparatus, check the measurements of soil moisture for accuracy, and determine whether the amplifier 13 and the detector tube 12 are performing consistently, the operator need only move the detector tube to raised or retracted position and take a reading from the neutron counter.

The counting unit is diagrammatically illustrated in FIGURE 3. While it is recognized that counting units of various types might be used, we have found that particularly accurate results are obtained from the direct counting apparatus set forth in the copending application, Serial No. 568,079, filed February 27, 1956, now Patent No. 2,927,246. One reason that the counter is especially suitable in conjunction with the present invention is because it makes an actual count of each nuclear disintegration within the detector tube, and thus makes an actual count of the slow neutrons striking the boron lining of the tube. The counter consists principally of a plurality of glow counter transfer tubes with associated circuits and power supply. Glow transfer tubes are known in the art and need not be described in detail here. Satisfactory results for purposes of this invention have been obtained with glow transfer tubes of the type commercially available as GS 10C.

The controls for the apparatus comprise only a power on-off switch, a count reset switch, and a count stop-start switch which have been diagrammatically represented by the control box shown in FIGURE 3. Each of the glow transfer tubes is operated by a univibrator circuit employing sub-miniature hearing aid tubes, such as type CK–522–AX, and the power supply consists of dry cell batteries.

Four glow counter tubes are shown in FIGURE 3, although a larger or a smaller number might be employed. As illustrated, the counter tubes are arranged in series so that the first tube records units; the second, tens; the third, hundreds; and the fourth, thousands. To make a count, the operator first resets the glow counter tubes to zero. When the counter stop-start switch is switched on, the pulses from the detector tube 12 corresponding to the neutron captured in the detector are amplified by amplifier 13 and recorded by the glow transfer counter tubes.

The combination of the glow transfer tubes with the univibrator circuit containing sub-miniature hearing aid tubes provides a counter which is compact and which may be easily transported. For this purpose, a suitable carrying case (not shown) may be used to enclose the counting unit. Also, to aid in transporting the probe unit, the casing 10 may be provided with a handle 27. Further, the probe may be provided with a guard 28 which is welded or otherwise secured to the container 20, and which preferably extends a uniform distance about the probe. This guard serves to protect the operator from dangerous gamma radiation during use and transportation of the apparatus by preventing close contact with the probe near the fast neutron source.

While we have set forth our invention in considerable detail for purposes of illustrating one embodiment thereof, it will be understood by those skilled in the art that many of these details may be varied without departing from the spirit and scope of the invention.

We claim:

1. In an apparatus for the quantitative measurement of the water content of soil, a vertically elongated tubular casing having an open lower end and providing a vertically elongated chamber therein, means supporting said casing above a soil surface with the chamber of said casing in communication and in axial alignment with a hole extending vertically into the soil, a vertically elongated detector tube for detecting slow neutrons telescopingly mounted for vertical movement through the open lower end of said casing between a retracted position within said casing and an extended position within said hole below said casing, an emitter of fast neutrons having the shape of a narrow ring, said ring being externally and perimetrically mounted upon said vertically elongated detector tube intermediate the upper and lower ends thereof and being movable with said tube between its retracted and extended positions, said tube having vertical dimensions substantially greater than said ring and having a major proportion of its axial length disposed above and below said ring, and counting means operatively associated with said detector tube for directly counting the number of slow neutrons detected by said detector tube and for quantitatively measuring the moisture of the soil when said tube is in its extended position, said counting means including indicating means for indicating the actual number of slow neutrons detected by said tube.

2. The structure of claim 1 in which a block of hydrogen-containing material is mounted upon and extends perimetrically about the intermediate portion of said tubular casing at substantially the same elevation as said fast neutron emitter when said detector tube is in retracted position for standardizing said apparatus.

References Cited in the file of this patent

UNITED STATES PATENTS

| | | |
|---|---|---|
| 2,303,709 | Siegert | Dec. 1, 1942 |
| 2,443,731 | Herzog et al. | June 22, 1948 |
| 2,666,142 | Herzog | Jan. 12, 1954 |
| 2,667,583 | Herzog | Jan. 26, 1954 |
| 2,680,201 | Scherbatskoy | June 1, 1954 |
| 2,712,081 | Fearon | June 28, 1955 |
| 2,750,144 | Beckwith | June 12, 1956 |
| 2,781,453 | Belcher et al. | Feb. 12, 1957 |
| 2,816,235 | Scherbatskoy | Dec. 10, 1957 |